United States Patent [19]

Chibata et al.

[11] 3,886,040

[45] May 27, 1975

[54] NOVEL PROCESS FOR PREPARING L-CITRULLINE

[75] Inventors: Ichiro Chibata; Tetsuya Tosa, both of Osaka; Tadashi Sato, Kyoto; Kozo Yamamoto, Osaka, all of Japan

[73] Assignee: Tanabe Seiyaku Co., Ltd., Osaka, Japan

[22] Filed: June 25, 1973

[21] Appl. No.: 373,497

[30] Foreign Application Priority Data

July 3, 1972  Japan................................ 47-66928

[52] U.S. Cl. ...................... 195/29; 195/47; 195/65; 195/73
[51] Int. Cl............................................ C12d 13/06
[58] Field of Search ............ 195/29, 30, 47, 65, 68, 195/73, DIG. 11

[56] References Cited
UNITED STATES PATENTS
3,821,086   6/1974   Lee et al.............................. 195/116

OTHER PUBLICATIONS

Kakimoto et al., Applied Microbiology, Vol. 22, No. 6, p. 992–999, (Dec., 1971).
Franks, Biochimica et Biophysica Acta, 252, (Nov., 1971), p. 246–254.

Primary Examiner—A. Louis Monacell
Assistant Examiner—Thomas G. Wiseman
Attorney, Agent, or Firm—Bierman & Bierman

[57] ABSTRACT

At least one acrylic monomer is polymerized in an aqueous suspension containing an L-arginine deiminase-producing microorganism. The acrylic monomers employed in the present invention include, among others, acrylamide, N,N'-lower alkylene-bis-acrylamide and bis(acrylamidomethyl)ether. The resultant immobilized L-arginine deiminase-producing microorganism is subjected to enzymic reaction with L-arginine or its salt. L-citrulline is produced. Alternatively, DL-arginine or its salt may be employed instead of L-arginine, thereby producing L-citrulline and D-arginine.

5 Claims, No Drawings

NOVEL PROCESS FOR PREPARING L-CITRULLINE

This invention relates to a novel process for preparing L-citrulline. More particularly, it relates to the production of L-cirtrulline by enzymic reaction of an immobilized L-arginine deiminase-producing microorganism with L-arginine.

It is known in the art that L-arginine deiminase has the ability to convert L-arginine to L-citrulline. Various methods are also known for producing L-citrulline by enzymic reaction of L-arginine deiminase with L-arginine. For example, L-citrulline can be prepared by cultivating an L-arginine deiminase-producing microorganism in a nutrient medium containing L-arginine. Alternatively, it can be prepared by extracting L-arginine deiminase from a microorganism, and reacting the enzyme with L-arginine. However, these methods are disadvantageous in the commercial production of L-citrulline. L-citrulline produced according to these methods is contaminated with the enzyme, microbial cells, nutrient sources of the medium and/or protein. Accordingly, additional steps for removing the enzyme and other contaminants from the product are required to recover L-citrulline in high purity. Furthermore, when the enzymic reaction is completed, the reaction solution is boiled and/or acidified to denature the enzyme or L-arginine deiminase-producing microorganism, and the enzyme precipitate is filtered off. Thus, the L-arginine deiminase or the L-arginine deiminase-producing microorganism can be used only once and must be discarded thereafter.

As a result of investigations, we have now found that an L-arginine deiminase-producing microorganism immobilized with a semipermeable membrane can be advantageously employed in producing L-citrulline from L-arginine or an inorganic acid addition salt thereof, or a mixture of L-citrulline and D-arginine from DL-arginine or an inorganic acid addition salt thereof.

According to the present invention, L-citrulline or a mixture of L-citrulline and D-arginine can be prepared by polymerizing at least one acrylic monomer in an aqueous suspension containing an L-arginine deiminase-producing microorganism, and subjecting the resultant immobilized L-arginine deiminase-producing microorganism to enzymic reaction with L-arginine, DL-arginine or their inorganic acid addition salt.

The polymerization reaction of the present invention can be preferably carried out in the presence of a polymerization initiator and a polymerization accelerator. Typical of suitable polymerization initiators are potassium persulfate, ammonium persulfate, vitamin $B_2$ and Methylene Blue. $\beta$-(dimethylamino)-propionitrile and N,N,N',N'-tetramethyl -ethylenediamine are among polymerization accelerations which can be employed. It is preferred to carry out the reaction at 0° to 50°C, especially at 20° to 40°C. The reaction may be completed within 10 to 60 minutes. The acrylic monomers employed in the present invention, among others, acrylamide, N,N'-lower alkylene-bis-acrylamide and bis-(acrylamidomethyl)ether. N,N'-methylene-bis-acrylamide and N,N'-propylene-bis-acrylamide are suitable as the N,N'-lower alkylene-bis-acrylamide. Moreover, preferred examples of L-arginine deiminase-producing microorganisms which are employed in the present invention include Pseudomonas putida ATCC 4359, Pseudomonas fluorescens IFO (Institute for Fermentation, Osaka, Japan) 3081, Pediococcus cerevisiae P-60 ATCC 8042, Sarcina lutea IAM (Institute of Applied Microbiology, Tokyo University, Japan) 1099, Mycobacterium avium IFO 3154, Streptomyces griseus IFO 3122 and Streptococcus faecalis ATCC 11420. All of these microorganisms are publicly available from the above-mentioned depositories. In this connection, however, it should be noted that the present invention is not limited to the use of these specific microorganisms, but includes within its scope the use of all of L-arginine deiminase-producing microorganisms. The polymerization reaction of the present invention serves to tightly entrap each of the microorganisms into the lattice of the polymer thereby affording high enzymic activity for a long period of time.

L-citrulline can be prepared by enzymic reaction of the resultant immobilized microorganism with L-arginine or an inorganic acid addition salt thereof. Alternatively, L-citrulline and D-arginine can be prepared by using DL-arginine or an inorganic acid addition salt thereof instead of L-arginine. Suitable examples of the inorganic acid addition salts of L- or DL-arginine include hydrochloride, sulfate and nitrate. The enzymic reaction of the present invention can be preferably accelerated by carrying it out in the presence of a surfactant. Any one of a cationic surfactant (e.g., cetyltrimethyl ammonium bromide), an anionic surfactant (e.g., triethanolamine laurylsulfate) and a nonionic surfactant (e.g., glyceryl monoalkylate) is employed for this purpose. Preferred concentration of the surfactant in the reaction solution is about 0.005 to 1.0 w/v percent.

The concentration of a substrate employed is not critical in the present invention. For example, L- or DL-arginine is dissolved in water at any concentration. The aforementioned immobilized microorganism is suspended in the solution of L- or DL-arginine, and the mixture is stirred at a temperature of 15° to 65°C. After the reaction is completed, the mixture is filtered or centrifuged to recover the immobilized microorganism for subsequent use. L-citrulline or a mixture of L-citrulline and D-arginine is recovered from the filtrate or supernatant solution. The optimum reaction condition for complete conversion of L-arginine or DL-arginine, respectively, to L-citrulline or a mixture of L-citrulline and D-arginine can be readily obtained by adjusting the reaction time. Alternatively, the enzymic reaction of the invention may be preformed by a column method. The column method enables the reaction to be carried out in a continuous manner. For example, the immobilized microorganism is charged into a column, and an aqueous solution of L- or DL-arginine is passed through the column at 15° to 65°C and at a convenient flow rate. An aqueous solution containing L-citrulline or a mixture of L-citrulline and D-arginine is obtained as the effluent. These products may be recovered by a known method such as, by condensing the effluent under reduced pressure. Further, the mixture of L-citrulline and D-arginine may be readily separated into each one of the components by any conventional method such as, treatment with an ion-exchange resin. In carrying out the enzymic reaction, the conversion rate of L-arginine (or DL-arginine) to L-citrulline (or L-citrulline and D-arginine) mainly depends upon the enzymic potency of the immobilized microorganism, the temperature and or the reaction time. In the column method, optimum reaction conditions for complete conversion of L- or DL-arginine, respectively, to L-citrulline or a mixture of L-citrulline and D-arginine can be readily obtained by adjusting the flow rate of the substrate solution.

In any case, the immobilized microorganism of the present invention retains a high level of the enzymic activity during the reaction. Moreover, due to its improved durability of the enzymic activity, the immobilized microorganism of the invention can be used repeatedly for the enzymic reaction.

Preferred embodiments of the present invention are illustrated by the following Examples. The term "lower alkylene" as used herein means alkylene groups having one to four carbon atoms.

EXAMPLE 1

1. An aqueous nutrient medium containing the following ingredients is prepared:

| Glucose | 1 | w/v % |
|---|---|---|
| Yeast extract | 1 | w/v % |
| Polypeptone | 0.5 | w/v % |
| L-arginine hydrochloride | 0.5 | w/v % |
| Ammonium chloride | 0.1 | w/v % |
| Dipotassium phosphate | 0.1 | w/v % |
| Magnesium sulfate 7 hydrate | 0.05 | w/v % |
| Manganese sulfate 4 hydrate | 0.01 | w/v % |
| Ferrous sulfate 7 hydrate | 0.0005 | w/v % |
| Sodium chloride | 0.2 | w/v % |

The aqueous nutrient medium is adjusted to pH 6.2. *Pseudomonas putida* ATCC 4359 is inoculated into 300 ml of the medium, and the medium is cultivated at 30°C for 40 hours under shaking. The medium is then filtered by centrifugation. The microbial cells thus collected are suspended in 12 ml of a physiological saline solution. 2.25 g of acrylamide, 0.12 g of N,N'-methylene-bis-acrylamide, 1.5 ml of 5 percent β-(dimethylamino)-propionitrile and 1.5 ml of 2.5 percent potassium persulfate are added to the suspension. The suspension is then allowed to stand at 25°C for 10 minutes. The insoluble product is ground and washed with a physiological saline solution. 25 g of an immobilized preparation of *Pseudomonas putida* ATCC 4359 are obtained.

2. 25 g, of the immobilized preparation of *Pseudomonas putida* ATCC 4359 are charged into a 1.6 cm × 15.5 cm column, and one liter of an aqueous 10 percent L-arginine hydrochloride solution is passed through the column at 37°C at a flow rate of 15 ml/hr. One liter of the effluent is concentrated at 60°C to bring the total volume to 250 ml. Then, the concentrated solution is allowed to stand at 5°C overnight. The crystalline precipitate is collected by filtration and washed with methanol. 74.0 g of L-citrulline are obtained. $[\alpha]_D^{25} = +21.3°$ (C = 10, 1N-HCl)

EXAMPLE 2

An immobilized preparation of *Pseudomonas putida* ATCC 4359 is prepared in the same manner as described in Example 1-1. 25 g of the immobilized preparation are charged into a 1.6 cm × 15.5 cm column. An aqueous 10 percent L-arginine hydrochloride solution is passed through the column at 37°C at a flow rate as shown in Table 1. The L-citrulline content in the effluent is assayed colorimetrically after reacting the effluent with diacetylmonooxide under an acidic condition, and the percentage conversion of L-arginine to L-citrulline is calculated therefrom. The results are shown in Table 1.

Table 1

| Flow rate (ml/hr) | Conversion to L-citrulline (%) |
|---|---|
| 50 | 50 |
| 25 | 90 |
| 15 | 100 |
| 6 | 100 |

EXAMPLE 3

25 g of an immobilized preparation of *Pseudomonas putida* ATCC 4359 prepared in the same manner as described in Example 1-(1) are charged in a 1.6 cm × 15.5 cm column. An aqueous 10 percent L-arginine hydrochloride solution is passed through the column at 37° or 50°C at a flow rate as shown in Table 2. The L-citrulline content in the effluent obtained with respect to time is assayed in the same manner as described in Example 2. The percentage conversion of L-arginine to L-citrulline is calculated therefrom. The results are shown in Table 2.

Table 2

| Operation time (days) | Conversion (%) to L-citrulline | | | |
|---|---|---|---|---|
| | Temperature | | | |
| | 37°C | | 50°C | |
| | Flow rate | | Flow rate | |
| | 50 ml/hr | 15 ml/hr | 50 ml/hr | 15 ml/hr |
| 3 | 50 | 100 | 80 | 100 |
| 6 | 48 | 100 | 80 | 100 |
| 9 | 49 | 100 | 78 | 100 |
| 12 | 48 | 100 | 66 | 90 |
| 15 | 48 | 100 | 50 | 88 |
| 18 | 50 | 100 | 42 | 83 |
| 21 | 48 | 100 | 33 | 78 |
| 24 | 46 | 100 | 30 | 72 |
| 27 | 44 | 100 | 24 | 65 |
| 30 | 44 | 100 | 20 | 55 |

EXAMPLE 4

25 g of an immobilized preparation of *Pseudomonas putida* ATCC 4359 prepared in the same manner as described in Example 1-(1) are suspended into 500 ml of an aqueous 10 percent L-arginine hydrochloride solution. The suspension is stirred at 37°C for a period of time. The L-citrulline content in the suspension is assayed in the same manner as described in Example 2, and the percentage conversion of L-arginine to L-citrulline is calculated therefrom. The results are shown in Table 3.

Table 3

| Reaction time (hr) | Conversion to L-citrulline (%) |
|---|---|
| 3 | 15 |
| 6 | 30 |
| 15 | 70 |
| 24 | 90 |
| 30 | 100 |

After stirring for 30 hours, the suspension is filtered. The filtrate is concentrated at 60°C to bring the total volume to 125 ml. Then, the concentrated solution is allowed to stand at 5° overnight. The crystalline precipitate is collected by filtration and washed with methanol. 35.2 g of L-citrulline are obtained. $[\alpha]_D^{25} = +21.3°$ (C = 1, 1N-HCl)

EXAMPLE 5

Streptococcus faecalis ATCC 11420 is inoculated into one liter of an aqueous nutrient medium (pH 6.2) having the same composition as described in Example 1-(1). The medium is cultivated at 30°C for 40 hours. The medium is then filtered by centrifugation. The microbial cells thus collected are suspended in 24 ml of a physiological saline solution. 4.5 g of acrylamide, 0.24 g of N,N'-methylene-bis-acrylamide, 3 ml of 5 percent β-(dimethylamino)-propionitrile and 3 ml of 2.5 percent potassium persulfate are added to the suspension. Then, the suspension is allowed to stand at 25°C for 10 minutes. The insoluble product is ground and washed with physiological saline solution. 48 g of an immobilized preparation of Streptococcus faecalis ATCC 11420 are obtained.

48 g of the immobilized preparation of Streptococcus faecalis ATCC 11420 are charged into a 2.2 cm × 17 cm column. 500 ml of an aqueous 10 percent L-arginine hydrochloride solution are passed through the column at 37°C and a flow rate of 10 ml/hr. 500 ml of the effluent thus obtained are treated in the same manner as described in Example 1-(2). 36.2 g of L-citrulline are obtained. $[\alpha]_D^{25} = +21.2°$ (C = 10, 1N-HCl)

EXAMPLE 6

Pediococcus cerevisiae ATCC 8042 is inoculated into one liter of an aqueous nutrient medium (pH 6.2) having the same composition as described in Example 1-(1). The medium is cultivated at 37°C for 40 hours, and filtered by centrifugation. The microbial cells thus collected are suspended into 12 ml of a physiological saline solution. This suspension is treated in the same manner as described in Example 1-(1). 25 g of an immobilized preparation of Pediococcus cerevisiae ATCC 8042 are obtained.

25 g of the immobilized preparation of Pediococcus cerevisiae ATCC 8042 are suspended into 500 ml of an aqueous solution containing 10 percent L-arginine hydrochloride and 0.01 percent triethanolamine laurylsulfate. The suspension is stirred at 37°C for 48 hours. The suspension is then filtered, and the filtrate is concentrated at 60°C to bring the total volume to 125 ml. The concentrated solution is allowed to stand at 5°C overnight. The crystalline precipitate is collected by filtration and washed with methanol. 33.3 g of L-citrulline are obtained. $[\alpha]_D^{25} = +21.3°$ (C =10, 1N-HCl)

EXAMPLE 7

An immobilized preparation of Pseudomonas putida ATCC 4359 is prepared in the same manner as described in Example 1-(1). 25 g of the immobilized preparation are charged into a 1.6 cm × 15.5 cm column. One liter of an aqueous 10 percent DL-arginine hydrochloride solution is passed through the column at 37°C at a flow rate of 10 ml/hr. Then, one liter of the effluent obtained is passed through a column of a strong cation exchange resin (manufactured by Rohm & Haas Co., under the trade name "Amberlite IR-120"). The column of the strong cation exchange resin is washed with water and eluted with an aqueous 5 percent ammonia solution. The eluate is concentrated under reduced pressure to a total volume of 250 ml. This concentrated solution is then passed through a column of a weak cation exchange resin (manufactured by Rohm & Haas Co., under the trade name Amberlite IRC50). The effluent thus obtained in concentrated to 125 ml, and 125 ml of methanol are added. The crystalline precipitate is collected by filtration. 34.8 g of L-citrulline are obtained. $[\alpha]_D^{25} = +21.3°$ (C = 10, 1N-HCl)

The column of the weak cation exchange resin is washed with water, and eluted with 2N-hydrochloric acid. The eluate is concentrated under reduced pressure to 125 ml. An anion exchange resin (manufactured by Rohm & Haas Co., under the trade name Amberlite IR-45) is added to the concentrated eluate to adjust the pH of the eluate to 6.0. Then, the mixture is filtered, and the filtrate is concentrated to dryness under reduced pressure. The residue thus obtained is recrystallized from ethanol. 40.5 g of D-arginine hydrochloride are obtained. $[\alpha]_D^{25} = -22.7°$ (C 32 2, 5N-HCl)

EXAMPLE 8

3 g of the microbial cells of Pseudomonas putida ATCC 4359 are suspended into 12 ml of a physiological saline solution. 2.25 g of acrylamide, 120 mg of N,N'-propylene-bis (acrylamide), 1.5 ml of 2.5 percent potassium persulfate are added to the suspension. Then, the suspension is allowed to stand at 25°C for 10 minutes. The insoluble product is ground and washed with a physiological saline solution. 25 g of an immobilized preparation of Pseudomonas putida ATCC 4359 are obtained.

25 g of the immobilized preparation of Pseudomonas putida ATCC 4359 are suspended into 500 ml of an aqueous 10 percent L-arginine hydrochloride solution. The enzymic reaction is carried out in the same manner as described in Example 4. The results are shown in Table 4.

Table 4

| Reaction time (hr) | Conversion to L-citrulline (%) |
| --- | --- |
| 8 | 30 |
| 24 | 85 |
| 30 | 100 |

EXAMPLE 9

3 g of the microbial cells of Pseudomonas putida ATCC 4359 are suspended into 12 ml of a physiological saline solution. 2.25 g of acrylamide, 120 mg of bis (acrylamidomethyl) ether, 1.5 ml of 5 percent β-(dimethylamino)-propionitrile and 1.5 ml of 2.5 percent potassium persulfate are added to the suspension. Then, the suspension is allowed to stand at 25°C for 10 minutes. The insoluble product is ground and washed with a physiological saline solution. 23 g of an immobilized preparation of Pseudomonas putida ATCC 4359 are obtained.

23 g of the immobilized preparation of Pseudomonas putiad ATCC 4359 are suspended into 500 ml of an aqueous 10 percent L-arginine hydrochloride solution. The enzymic reaction is carried out in the same manner as described in Example 4. The results are shown in Table 5.

Table 5

| Reaction time (hr) | Conversion to L-citrulline (%) |
| --- | --- |
| 8 | 35 |
| 24 | 90 |
| 30 | 100 |

EXAMPLE 10

3 g of the microbial cells of *Pseudomonas putida* ATCC 4359 are suspended into 12 ml of a physiological saline solution. 30 mg of N,N'-methylene-bis(acrylamide), 0.9 ml of 0.112 percent N,N,N',N'-tetramethylethylenediamine and 0.1 ml of 2.5 percent ammonium persulfate are added to the suspension. Then, the suspension is allowed to stand at 37°C for 60 minutes. 21 g of an immobilized preparation of *Pseudomonas putida* ATCC 4359 are obtained.

21 g of the immobilized preparation of *Pseudomonas putida* ATCC 4359 are suspended into 500 ml of an aqueous 10 percent L-arginine hydrochloride solution. The enzymic reaction is carried out in the same manner as described in Example 4. The results are shown in Table 6.

Table 6

| Reaction time (hr) | Conversion to L-citrulline (%) |
| --- | --- |
| 8 | 35 |
| 24 | 100 |
| 30 | 100 |

EXAMPLE 11

3 g of the microbial cells of *Pseudomonas putida* ATCC 4359 are suspended into 12 ml of a physiological saline solution. 30 mg of N,N'-propylene-bis(acrylamide), 0.9 ml of 0.112 percent N,N,N',N'-tetramethylethylenediamine and 0.1 ml of 2.5 percent ammonium persulfate are added to the suspension. Then, the suspension is allowed to stand at 37°C for 60 minutes. 26 g of an immobilized preparation of *Pseudomonas putida* ATCC 4359 are obtained.

26 g of the immobilized preparation of *Pseudomonas putida* ATCC 4359 are suspended in 500 ml of an aqueous 10 percent L-arginine hydrochloride solution. The enzymic reaction is carried out in the same manner as described in Example 4. The results are shown in Table 7.

Table 7

| Reaction time (hr) | Conversion to L-citrulline (%) |
| --- | --- |
| 8 | 25 |
| 24 | 80 |
| 30 | 100 |

EXAMPLE 12

3 g of the microbial cells of Pseudomonas putida ATCC 4359 are suspended in 12 ml of a physiological saline solution. 30 mg of bis(acrylamidomethyl)ether, 0.9 ml of 0.112 percent N,N,N', N'-tetramethylethylenediamine and 0.1 ml of 2.5 percent ammonium persulfate are added to the suspension. Then, the suspension is allowed to stand at 37°C for 60 minutes. 25 g of an immobilized preparation of *Pseudomonas putida* ATCC 4359 are obtained.

25 g of the immobilized preparation of *Pseudomonas putida* ATCC 4359 are suspended in 500 ml of an aqueous 10 percent L-arginine hydrochloride solution. The enzymic reaction is carried out in the same manner as described in Example 4. The results ae shown in Table 8.

Table 8

| Reaction time (hr) | Conversion of L-citrulline (%) |
| --- | --- |
| 8 | 35 |
| 24 | 95 |
| 30 | 100 |

What we claim is:

1. A process for preparing L-citrulline or a mixture of L-citrulline and D-arginine which comprises polymerizing at least one acrylic monomer in an aqueous suspension of microbial cells of *Pseudomonas putida* ATCC 4359 to produce immobilized microbial cells thereof, and subjecting said immobilized cells to enzymic reaction with L- or DL-arginine or an organic acid addition salt thereof.

2. The process according to claim 1, wherein the acrylic monomer is selected from the group consisting of acrylamide, N,N'-lower alkylene-bis-acrylamide and bis(acrylamidomethyl) ether.

3. The process according to claim 1, wherein the polyermization is carried out in the presence of a polymerization initiator and a polymerization accelerator at 0° to 50°C, and the enzymic reaction is carried out at 15° to 65°C.

4. The process according to claim 3, wherein the polymerization initiator is selected from the group consisting of potassium persulfate, ammonium persulfate, vitamin $B_2$ and Methylene Blue, and the polymerization accelerator is selected from the group consisting of β-(dimethylamino)-propionitrile and N,N,N'-tetramethylethylenediamine.

5. A process for preparing L-Citrulline or a mixture of L-citrulline and D-arginine which comprises polymerizing N,N'-lower alkylene-bis-acrylamide or bis (acrylamidomethyl) ether or copolymerizing acrylamide with N,N'-lower alkylene-bis-acrylamide or bis (acrylamidomethyl)ether, said polymerization or copolymerization being carried out in an aqueous suspension of microbial cells of Pseudomonas putida ATCC 4359 at 0° 50°C in the presence of a polymerization initiator and a polymerization accelerator, and subjecting the resultant immobilized microbial cells of *Pseudomonas putida* ATCC 4359 to enzymatic reaction with L- or DL-arginine or an inorganic acid addition thereof at 15° to 65°C.

* * * * *